United States Patent [19]

Fahim et al.

[11] 4,129,064

[45] Dec. 12, 1978

[54] FLUID OPERATED STEPPING MOTOR

[76] Inventors: Atef E. F. Fahim, 10124 Place Meilleur, No. 30; Richard M. H. Cheng, 3452 Rosedale Ave., N.D.G., both of Montreal, Quebec, Canada

[21] Appl. No.: 675,228

[22] Filed: Apr. 8, 1976

[51] Int. Cl.$^2$ .............................................. F16H 27/02

[52] U.S. Cl. .............................................. 92/129; 74/126; 91/40; 92/136; 92/166

[58] Field of Search .............................................. 74/126, 128; 92/129, 92/136, 166, 73, 68, 69, 150; 91/36, 39, 40

[56] References Cited

U.S. PATENT DOCUMENTS

| | | | |
|---|---|---|---|
| 2,604,078 | 7/1952 | Chelminski | 91/39 |
| 2,691,314 | 10/1954 | Stevens | 91/36 |
| 3,017,781 | 1/1962 | Toomey | 74/126 |
| 3,065,594 | 11/1962 | McGay | 74/126 |
| 3,075,504 | 1/1963 | Vogel | 92/73 |
| 3,254,174 | 5/1966 | Elliott | 74/126 |
| 3,466,936 | 9/1969 | Gaupin | 74/126 |
| 3,501,968 | 3/1970 | Fredell | 74/126 |
| 3,504,206 | 3/1970 | Fritsch | 74/126 |
| 3,661,059 | 5/1972 | Hunter | 91/499 |
| 3,791,229 | 2/1974 | Liedtke | 74/128 |
| 3,844,178 | 10/1974 | Gachot | 74/128 |
| 4,036,476 | 7/1977 | Douce | 74/128 |

FOREIGN PATENT DOCUMENTS

| | | | |
|---|---|---|---|
| 564519 | 10/1944 | United Kingdom | 74/128 |

*Primary Examiner*—Martin P. Schwadron

*Assistant Examiner*—Abraham Hershkovitz

*Attorney, Agent, or Firm*—Charles E. Brown

[57] ABSTRACT

A fluid operated stepping motor comprising a cylinder housing having one or more fluid cylinders to alternately displace at least two cam engaging members when pressure from a pressure source is applied to one of the cylinders. The cam engaging members are diametrically opposed. A cam is secured relative to the cylinder housing and having a plurality of teeth asymmetrically disposed thereon, is also provided. Each tooth has a power profile surface and an idle profile surface. The power profile surface is slidingly engageable by one of the cam engaging members when pressure is applied to displace the said one cam engaging member axially whereby the power profile surface will cause relative rotational displacement between the cylinder housing and the cam.

3 Claims, 9 Drawing Figures

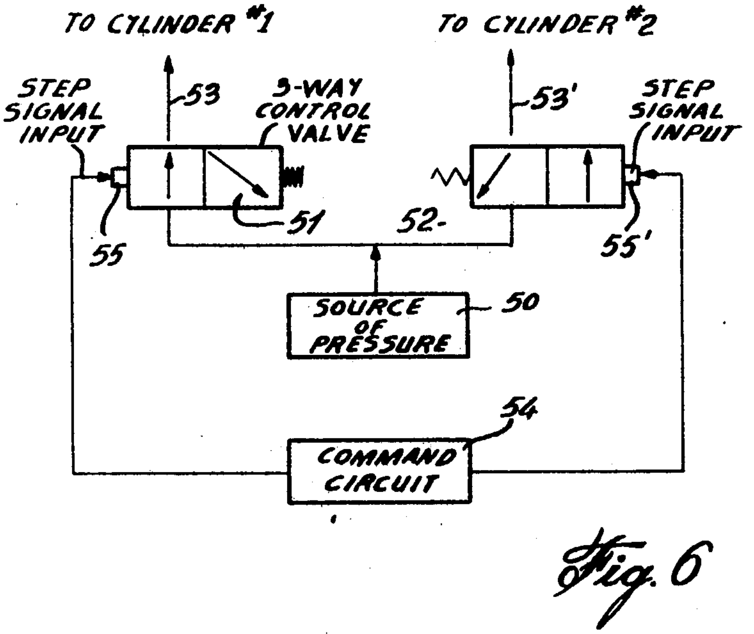
Fig. 6
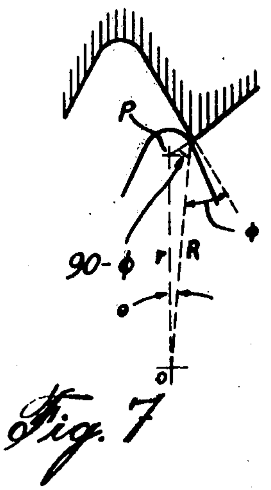
Fig. 7
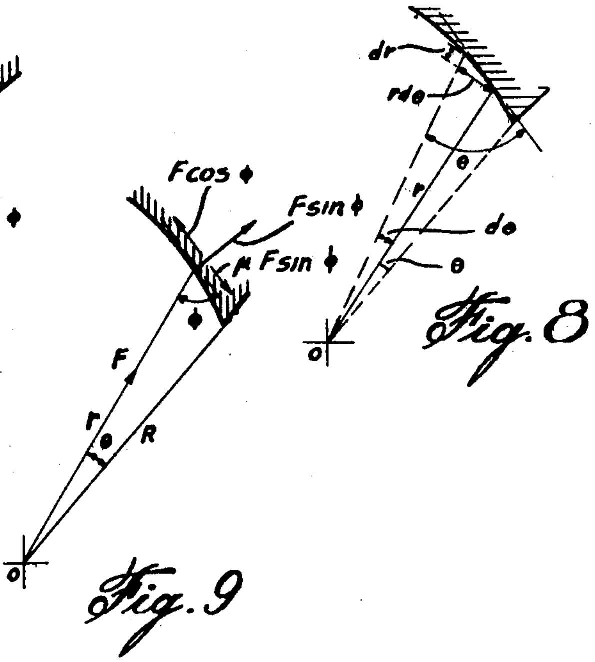
Fig. 8
Fig. 9

FLUID OPERATED STEPPING MOTOR

BACKGROUND OF THE INVENTION (a) Field of the Invention

The present invention relates to an improved fluid operated stepping motor having accurate resolution and a high output torque.

(b) Description of Prior Art

The use of stepping motors in the fields of registering, indexing and positioning is usually preferred to continuous-running motors because of absence of feedback loops as in conventional servo systems.

Stepping motors can be classified into the following two categories according to their output characteristics:

Low torque, high maximum stepping speed, as in most electric steppers (such as Sigma, model 20-22-150D200 - F 1.5, having a maximum speed of 10,000 steps/sec and a very low torque at that speed, and a torque of 30 oz-in. at 50 steps/sec;

high torque fair stepping speed. Commercially available ones that fall under this category are mainly electrohydraulic (typical characteristics are 2000 steps/sec and a torque figure around 87 lb-in. at 1000 PSI-G oil pressure).

The cost of the necessary accessories as pulse generating and translator circuits, hydraulic supply package and so forth, in addition to that of the motor itself, makes them unsuitable for certain class of industrial applications.

For a range of medium, torques and low stepping speeds, there has been several developments of pneumatic steppers. For instance, there is known a motor which resembles a Wankel engine, having a triangular rotor. Precision machining is therefore mandatory, and resolution is of the order of several radians. Discrepancy between actual and theoretical resolutions is appreciable. A second motor is also known in which an eccentric rotor is forced to rotate by an air pressure differential across two chambers. The accuracy of the resolution of such motor is bad and the torque output is very small. Another known motor is provided having a stepping speed of up to 250 steps/sec with good torque-speed characteristics. It is similar to a multiphase electric stepper, in having a flexible spline as a rotor, which is actuated by a number of elastic bags pressurized sequentially by a fluidic translator circuit. The major disadvantage of this motor lies in the delicate construction of the spline-rotor.

A further type of fluid operated stepping motor is known as described in U.S. Pat. No. 3,661,059 issued on May 9, 1972 to Chandler Evans Inc. This patent teaches a complex stepping motor design which comprises a plurality of pistons disposed parallel to one another on an axis which is parallel to the axis of rotation. This type of motor also requires a complex logic circuit and utilizes a symmetric cam. The control circuit is necessary for the operation of the motor to identify the sequential operation of the cylinders. Also, the motor incorporates valving in the motor structure which makes it bulky and unlikely not capable of being miniaturized. Also, the symmetrical cam is provided with teeth having more than two surfaces. Thus, there is the need to provide a fluid operated stepping motor which is relatively easy to construct, and which utilizes a more simple principal whilst providing excellent accuracy in resolution and a high output torque.

SUMMARY OF THE INVENTION

It is a feature of the present invention to provide a fluid operated stepping motor which substantially overcomes all of the above-mentioned disadvantages and which is simple in design and requires relatively simple control logic which is provided externally of the motor housing.

According to the above feature, from a broad aspect, the present invention provides a fluid operated stepping motor comprising a cylinder housing having one or more fluid cylinders to alternately displace at least two cam engaging members when pressure from a pressure source is applied to one of the cylinders. The cam engaging members are diametrically opposed. A cam is secured relative to the cylinder housing and having a plurality of teeth assymetrically disposed thereon is also provided. Each tooth has a power profile surface and an idle profile surface. The power profile surface is slidingly engageable by one of the cam engaging members when pressure is applied to displace the said one cam engaging member axially whereby the power profile surface will cause relative rotational displacement between the cylinder housing and the cam.

BRIEF DESCRIPTION OF THE DRAWINGS

A preferred embodiment of the present invention will now be described with reference to the accompanying drawings, in which:

FIG. 6 is a schematic illustration of the control circuit;

FIG. 7 is a schematic representation showing the angle of off-set relation to cam geometry;

FIG. 8 is a schematic representation illustrating the angle of attack in relation to cam profile; and FIG. 9 is a schematic representation illustrating the force analysis on the cam.

DETAILED DESCRIPTION OF THE DRAWINGS

Figure 1:
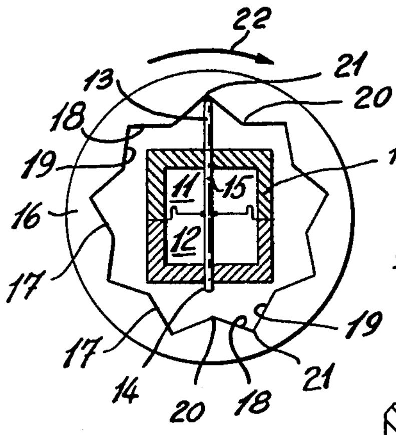
FIG. 1 is a sectional view illustrating one application of the stepping motor concept of the present invention.

Referring now to the drawings and more particularly to FIG. 1, there is illustrated the principal on which the motor of the present invention operates and utilizing a cam/actuator arrangement. The stepping motor of the present invention comprises essentially a cylinder housing 10 having one or more fluid cylinders 11 and 12 to alternately displace at least two cam engaging members 13 and 14, when pressure from a pressure source (not shown) is applied to one of the cylinders 11 and 12. The actuator herein shown is a piston rod 15 having opposed ends constituting the cam engaging members 13 and 14. Piston rod 15 is forced to oscillate by inserting and removing fluid pressure from within the fluid cylinders 11 and 12. As shown, the cam engaging members are associated with a cam 16 which lies in planar alignment with the two cam engaging members which are diametrically opposed. The cam 16 has a plurality of teeth 17 which are assymetrically disposed about the inner surface of the cam 16. Each tooth defines a power profile surface 18 and an idle profile surface 19.

The power profile surface 18 constitutes a displacement surface which is slidingly engaged by one of the cam engaging members 13 and 14 when pressure is applied to one of these members whereby to cause relative rotational displacement between the cylinder housing 10 and the cam 16. The power profile surface 18 has a cam engaging leading edge 20 at a first end thereof and a displacement end 21 at a second end thereof. As shown, the idle profile surface 19 extends angularly from the displacement end 21 and at a predetermined angle whereby the cam engaging member is not subject to axial displacement thereby. As shown in FIG. 1 the displacement end 21 is in off-set alignment with a diametrically opposed tooth whereby when the cam engaging member 13 is in alignment with the displacement end 21, the other cam engaging member sits on the leading edge 20 of the diametrically opposed tooth. This assymetric arrangement of the teeth leads to the definition of the angle of resolution $\alpha$ as $\alpha = \pi/(2n + 1)$ where n has to be an integer.

The number of teeth L in the cam is given by $$L = 2n + 1$$

In operation when fluid pressure is applied to the cylinder 10 to force the piston rod 15 to travel downwards, the end of the rod or cam engaging member 14, will engage with the power profile surface 18 starting at the leading edge 20 and follows all the way until it reaches the displacement end 21. If the piston 15 is prevented from rotating, the cam 16 will be forced to rotate in the clockwise direction as indicated by arrow 22 and by an angle equal to the resolution $\alpha$. Once the piston rod 15 reaches the position $\alpha$, it locks the cam 16 firmly in position as long as the pressure in the cylinder 10 is maintained. However, on reversing the stroke of the cylinder 10, the piston rod 15 starts to engage with the power profile surface of the tooth which is diametrically opposed. It can be seen that the cam 16 is again forced to rotate in the clock-wise direction. Thus, by reversing the stroke of the cylinder 10 alternately, the cam will step successively in the same direction.

The proper operation of the motor depends on appropriate choice of a number of parameters associated with the cam profiles. The more important ones are the offset $\epsilon$, minimum cam radius R, tip radius $\rho$ of the piston rod, and initial angle of attack $\Phi$ of a driving profile. These parameters are indicated in FIG. 7.

The importance of the offset $\epsilon$ is obvious when considering FIG. 7, where $\epsilon$ is defined as the angle displacement between the axis of the piston rod, and the leading edge of a driving profile (measured when the piston-rod is in its uppermost position). The offset therefore eliminates the danger of the piston rod hitting the tip of the profile as the rod starts to engage with a driving profile. With an offset which is not properly selected, either damage of the piston-rod/cam profile will result, or the motor will seize altogether.

$\epsilon$ is related to the other geometrical parameters as given by the expression $$\epsilon > \sin^{-1}\left[\frac{\rho\cos\Phi}{R^2 + \rho^2 - 2R\rho\cos\Phi}\right]$$

The linear displacement of the piston rod is constrained with the cam profile as illustrated in FIG. 8. It can be shown that at any angular displacement $\theta$, the angle of attack $\phi$ (which is defined as the angle between the point of contact of the piston rod to the cam and the tangent to the cam profile at the point of contact) is given by $$\phi = \cot^{-1}\left[\frac{dr}{d\theta}/r\right]$$

where $r = r(\theta)$ describes the cam profile in the polar coordinates system. The choice of the function $r(\theta)$ will influence the performance of the stepping motor, as will be discussed later.

Figure 2:
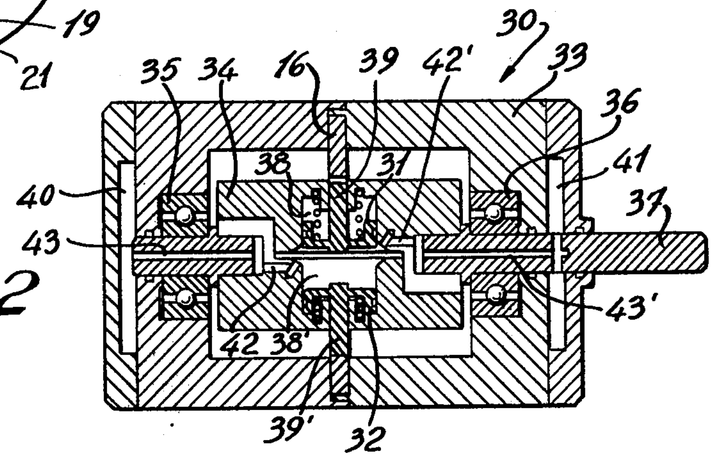
FIG. 2 is a sectional view of a stepping motor constructed in accordance with a further application of the concept of the present invention.

Referring now to FIG. 2, there is shown the construction of a stepping motor 30 constructed in accordance with the present invention. The design of the motor 30 is based on the same principal as previously described relative to FIG. 1 with the exception that the double-acting cylinder 10 is replaced by two single-acting spring-return pistons 31 and 32. The cam 16 is herein shown fixed to the motor body 33 while the cylinder assembly 34 rotates between bearings 35 and 36 carrying with it the output shaft 37.

As herein shown, each piston 31 and 32 consists of a fluid cylinder 38 and 38' and a piston rod 39 and 39'. Both piston rods are axially aligned with one another and the cylinders 38 and 38' are diametrically opposed.

The motor body 33 is provided with a first and second fluid passage 40 and 41 and conduit means herein shown as a first conduit 42 and 42' in the cylinder housing 34 associated with a respective fluid cylinder 38 and 38' and a second conduit 43 and 43' in the shaft 37, communicates the first and second fluid passages 40 and 41 with a respective one of the fluid cylinders 38 and 38'.

Fluid pressure is applied to the first and second fluid passages 40 and 41 by a control circuit as shown in FIG. 6. The control circuit comprises a source of pressure 50 which is connected to two three-way control valves 51 and 52, each of which has an output conduit 53 and 53' connecting to a respective one of the fluid passages 40 and 41. A command circuit 54 constituted by an oscillator, a counter or other form of logic control circuit will provide the necessary step signals at the step signal inputs 55 and 55' to determine the number of times that fluid pressure is applied to the cylinder housings 38 and 38'. This will cause the sequential operation of the pistons to cause the relative rotational displacement of the cylinder housing 34 with respect to the cam 16. As shown in FIG. 6, pressure is being applied to the first cylinder while the second cylinder has been vented.

Figure 3:
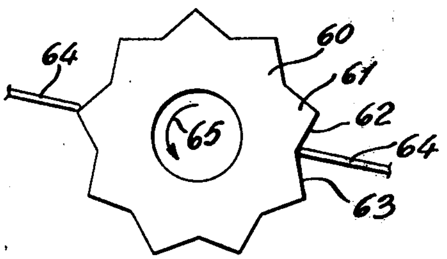
FIG. 3 is a schematic illustration of a still further version of the concept of the present invention and in simplified form showing the cam and piston rods.

Referring now to FIG. 3, there is shown another embodiment of the principal of the present invention. As herein shown, the cam 60 is provided with teeth 61 on the outer periphery thereof — each of the teeth defining a power profile surface 62 and an idle profile surface 63 as above defined. The cam engaging members 64 or piston rod ends are again diametrically opposed but on opposed sides of the outer periphery of the cam 60. By causing actuation of the piston rod ends 64 as aforementioned, the cam 60 or housing (not shown) is caused to rotate. As shown in FIG. 3 the piston rod ends are mounted in a fixed position and are actuable axially to alternately engage the teeth of the cam 60 to cause the cam 60 to rotate in the direction indicated by arrow 65.

Figure 4:
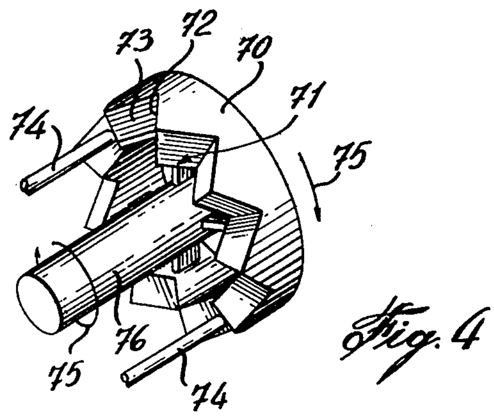
FIG. 4 is a perspective view of a still further version of a stepping motor constructed in accordance with the concept of the present invention and again illustrating the cam and piston rods.

Referring now to FIG. 4 there is shown a still further embodiment of the concept of the present invention wherein the cam 70 is a member, herein shown as a disc, having radially disposed teeth 71 extending continuously about a vertical face of the cam 70. Again, each tooth 71 is provided with a power profile surface 72 and an idle profile surface 73 whereby relative rotation between the piston rod ends 74 and the cam 70 is provided. In this particular illustration the piston rods ends are supported in a fixed position and are actuable axially to alternately engage the teeth of the cam 70 to cause the cam 70 to rotate in the direction of arrow 75. Thus, the output shaft 76 will transfer the clock-wise rotation of the disc.

Figure 5:
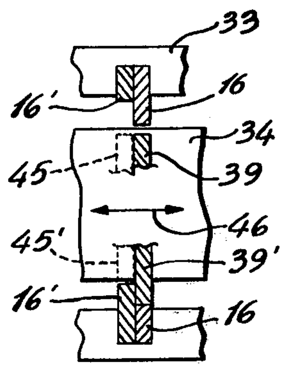
FIG. 5 is a sectional view of a portion of FIG. 2 illustrating a further modification thereof.

Referring now to FIG. 5 there is shown a further modification of the embodiment as illustrated in FIG. 2. As herein shown, there are two discs 16 and 16' secured in side-by-side parallel relationship with the teeth of one disc being inverted (not shown) relative to the teeth of the other disc. The axially aligned piston rods 39 and 39' are displaceable from a first position in alignment with cam 16 to a second position as shown by phantom lines 45 and 45' in alignment with the second cam 16'. This horizontal displacement as indicated by arrow 46 is preferably achieved by displacing the cylinder housing 34 and/or the shaft 37 horizontally within the housing 33. Thus, by having the teeth of one of the cams 16 and 16' inverted, the relative rotational displacement between the cylinder housing 34 and the cams 16 and 16' or motor housing 33 is bi-directional.

The following is an analysis of the theoretical characteristics and experimental results of a stepping motor constructed in accordance with the embodiments shown in FIG. 2.

a — Torque output

For deriving the equations of the theoretical torque output of the motor at any angle $\theta$ within a resolution $\alpha$, the relation r($\theta$) should be clearly defined.

Analysing the force acting on the cam-actuator system as shown in FIG. 9, results in the following expression for torque:

$$T = \frac{Frs}{s + \mu_1(2r - 2a + s)} \cdot \frac{\cos\phi - \mu\sin\phi}{\sin\phi + \mu\cos\phi}$$

where F is the net force on the piston rod, and is the coefficient of friction between the cam engaging members of the cam, s is the piston rod guide length, $\mu_1$ is coefficient of friction between piston rod and guide and a is the initial value of r.

b — profile:

Neglecting the guide, an approximate equation for the torque can be derived. Differentiating this equation and equating it to zero yields the angle for torque at any radius as $$\phi = (\cot^{-1}\mu)/2$$

This relation gives the angle $\phi$ as a function of the coefficient of friction. It shows that for torque throughout the step, $\phi$ should be constant since $\mu$ is assumed to be constant. Thus, from the result of differentiating (relating to the angle of attack $\phi$), the curve that satisfies this condition of constant angle $\phi$ is a logarithmic spiral.

$$r = a\, e^{m\theta}$$

where a and m are constants depending on the cam size desirable (to a lower limit) and the value of $\mu$. Other profiles than the logarithmic spiral profile would result in a different torque T displacement $\theta$ relation, as can be shown from the equations mentioned above.

The stepping motor of this invention is most suitable for applications where high resolution accuracy and high torque are needed. A typical application is in an indexing table, where excessively high stepping speed is not generally necessary and where the locking after each step is a desirable, if not a necessary requirement. A stepping motor constructed in accordance with this invention will provide a compact design with full indexing and locking features accommodated within the motor body. By simply changing to a cam of a different number of teeth, a different stepping resolution is readily obtained from the same motor.

Another application where such motor is useful is in driving a peristatic pump for metering small quantities of liquids. The amount of liquid to be metered can be accurately controlled by controlling the number of pulsing signals applied to the motor. By applying two or more motors, an accurate liquid mixing system is obtained.

Where it is necessary to provide stepping motion in both directions of rotation, the seeming drawback of this motor, can also be easily overcome by the use of a gear box.

It is within the ambit of the present invention to provide any obvious modification of the stepping motor of the present invention, provided such modifications fall within the ambit of the present invention as broadly defined by the appended claims.

We claim:

1. A fluid operated stepping motor comprising a double acting cylinder having a working member, a pair of piston rods fixed to said working member, said working member being displaced by pressure from a pressure source applied to said cylinder, a cam in surrounding relationship with respect to said cylinder and in planar alignment with said piston rods and having a plurality of teeth asymetrically disposed on an inner face thereof, each tooth having a power profile surface and an idle profile surface, said piston rods being axially aligned and extending out of opposite cylinder heads to alternately engage said power profile on teeth of said cam disposed in alignment therewith such as to result in relative rotation of the cam with respect to the cylinder as each piston rod end alternately engages teeth oppositely disposed with respect to each other.

2. A stepping motor as claimed in claim 1 wherein said cam is an annular ring having a circular inner face with said teeth being disposed side-by-side along said entire inner face, said cylinder extending through the center of said annular ring.

3. A stepping motor as claimed in claim 2, wherein said power profile surface has a displacement surface having a cam engaging leading edge at a first end thereof and a displacement end at a second end thereof, said idle profile surface extending angularly from said displacement end, said displacement end being in offset alignment with a diametrically opposed tooth whereby when one of said at least two cam engaging piston rod ends is in alignment with a displacement end the diametrically opposed cam engaging piston rod end is in alignment with said leading edge.

* * * * *